March 10, 1942.            D. S. LANGELL            2,276,213
SHIPPING MEANS FOR LAWN MOWERS
Filed Oct. 14, 1940
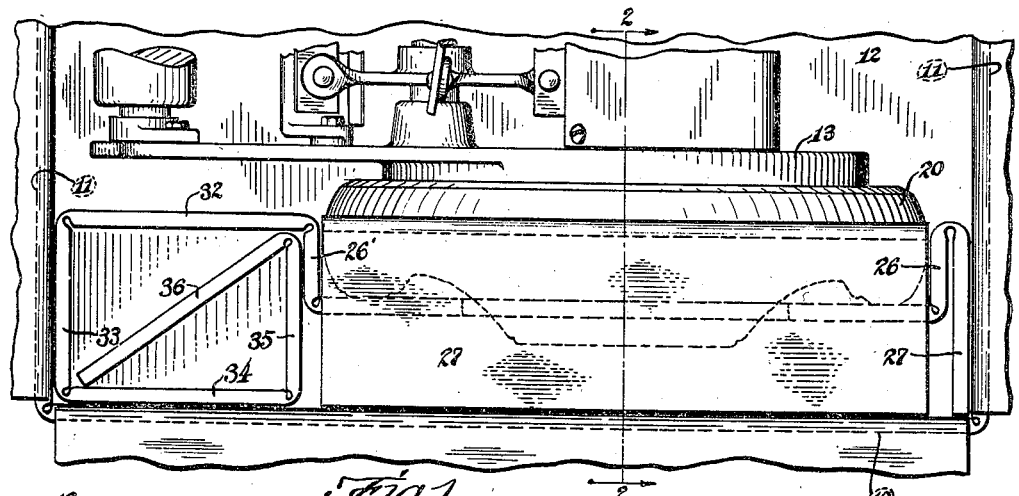
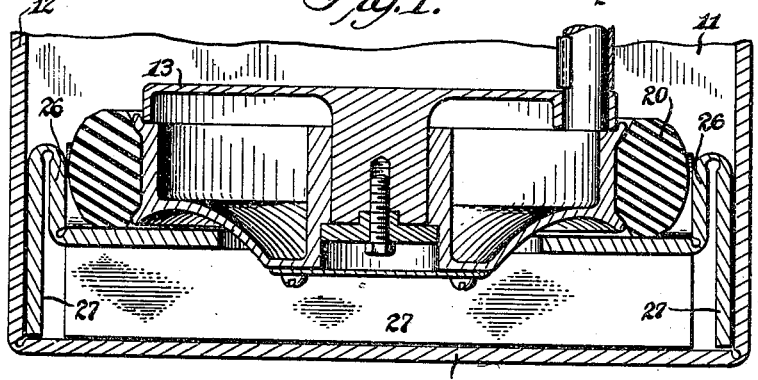
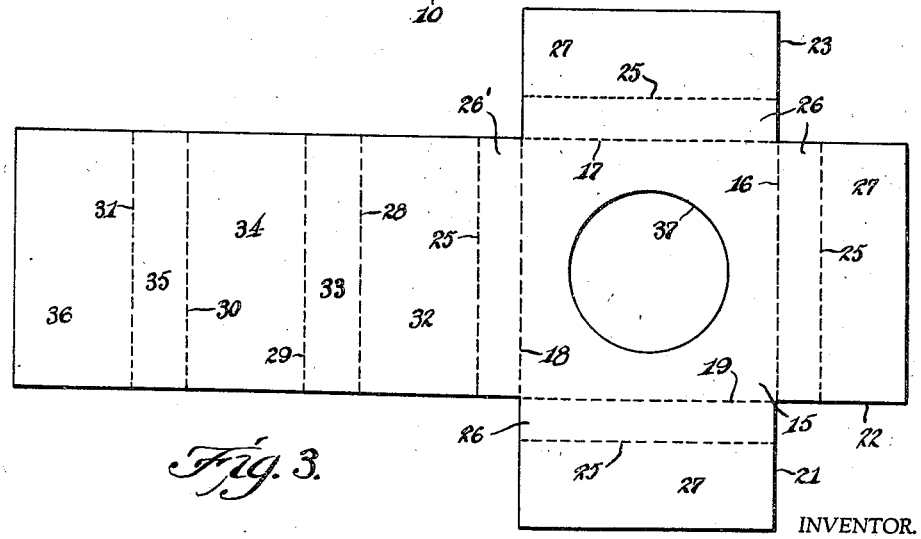
INVENTOR.
DAN S. LANGELL,
BY: Hood & Hahn
ATTORNEYS.

Patented Mar. 10, 1942

2,276,213

UNITED STATES PATENT OFFICE 2,276,213

SHIPPING MEANS FOR LAWN MOWERS

Dan S. Langell, Indianapolis, Ind., assignor to Indianapolis Wire Bound Box Company, Indianapolis, Ind., a corporation of Indiana Application October 14, 1940, Serial No. 361,025

4 Claims. (Cl. 206—46)

The object of my invention is to provide means for so bracing a lawn mower within a suitable shipping container as to maintain the mower out of direct contact with the inner surfaces of the container and so as to insure against marring the finish of the outer or exposed faces of the traction wheels.

The accompanying drawing illustrates my invention,

Fig. 1 is a horizontal section of one end of a container showing a fragmentary portion of the mower in position as defined by my improved holding means;

Fig. 2 is a section on line 2—2 of Fig. 1; and

Fig. 3 is a plan, on a smaller scale, of the blank from which my improved holding means is formed.

In the drawing, 10, 11, and 12 indicate respectively an end wall, a side wall, and the bottom of the container which may be of any desired material, although conveniently of corrugated fiber board, having internal dimensions suitable for the reception of the mower 13 together with the improved holding means now to be described.

My improved holding means is formed from a cross shaped blank, conveniently of corrugated fiber board, comprising a rectangular main body 15 defined by fold lines 16, 17, 18, and 19 spaced approximately the outside diameter of the traction wheel 20 of the mower, and three short flaps 21, 22, and 23 of equal length and a long flap 24 opposite flap 22.

Each of the flaps 21, 22, and 23 is divided by an intermediate fold line 25 into a section 26 adjacent the main body 15 and an end section 27; the section 26 having an extent sufficient to overlie the wheel 20 and the section 27 having an extent sufficient to overlie the section 26 and projecting in the opposite direction beyond the plane of main body 15 beyond the end of wheel 20 and to the inner face of end wall 10. Flap 24 is divided by fold lines 25, 28, 29, 30, and 31 into portions 26' (like portions 26), 32, 33, 34, 35, and 36; portion 26' being folded in the same direction as portions 26; portion 32 lying parallel with the plane of the main body 10 and extending from the periphery of wheel 20 to the inner face of the adjacent side wall 11 of the container; portion 33 lying parallel with the portion 26' and alongside and in engagement with the inner face of said side wall 11; portion 34 lying parallel with portion 32 and extending along and in engagement with the inner face of adjacent end wall 10; portion 35 lying parallel with portion 33 and extending to the adjacent face of portion 32 and alongside and into contact with portion 26'; and portion 36 extending diagonally in the rectangle formed by the portions 32, 33, 34, and 35 so as to brace the same.

The main body 15 is centrally perforated at 37 with a perforation of sufficient size to receive the projecting central portion of wheel 20 so that, when main body 15 lies in contact with the outer end face of wheel 20 no portion of the main body 15 will contact the finish of the outer end surface of the main body of the wheel 20, as clearly shown in Fig. 2.

My improved holding device having been folded in the manner described and illustrated in the drawing and placed one over each traction wheel of the mower, the mower with said holding devices so placed is dropped vertically into the main receptacle.

It will be noted that traction wheels of the mower are thus resiliently supported by the periphery of the tire upon the cushions formed by the double thickness produced by the portions 26 and 26', and their overlapping portions 27 and 32 respectively and the mower as a whole is definitely positioned horizontally in the container, in one direction by the vertically set portions 26 and 27, and in the other direction by the bracing structure formed by the parts 26', 32, 33, 34, 35, and 36.

I claim as my invention:

1. Means for bracing a lawn mower in a container comprising a cruciform blank having a perforation centrally of the cross and sized to permit free projection of a lawn mower wheel hub therethrough when portions of the blank adjacent the perforation contact the outer face of the wheel tire, with the arms of said cruciform blank each bent in one direction to overlie and engage the periphery of the mower wheel and then reversely bent to overlie said first portions and to project beyond the main body of the blank beyond the axial extent of the traction wheel of the mower, and the longer arm of the blank folded by successive folds in the same direction to form a diagonally braced substantially rectangular chocking element.

2. Means for bracing a lawn mower in a container comprising a cruciform blank with the arms of said cruciform blank each bent in one direction to overlie and engage the periphery of the mower wheel and then reversely bent to overlie said first portions and to project beyond the main body of the blank beyond the axial extent of the traction wheel of the mower, and the longer arm of the blank folded by successive folds in the same direction to form a diagonally braced substantially rectangular chocking element.

3. A lawn mower package comprising a main container within which a mower may be placed, and a bracing filler of sheet material comprising a polygonal main body having bounding flaps each of which is bent substantially at right angles to the plane of the main body to form a cup having internal cross diameters approximating the largest diameter of the mower wheel so that each of the side bent flaps will overlie said largest diameter, and the outer ends of a plurality of said flaps are also reversely bent each to overlie its aforesaid bent portion and extending to and abutting an adjacent wall of the main container.

4. A lawn mower package comprising a main container within which a mower may be placed, and a bracing filler of sheet material comprising a polygonal main body having bounding flaps each of which is bent substantially at right angles to the plane of the main body to form a cup having internal cross diameters approximating the largest diameter of the mower wheel so that each of the side bent flaps will overlie said largest diameter, and the outer ends of a plurality of said flaps are also reversely bent each to overlie its aforesaid bent portion and extending to and abutting an adjacent wall of the main container, said main body being centrally perforated to permit the wheel hub to project therethrough and the main body to contact the side of the wheel rim.

DAN S. LANGELL.